United States Patent
Mo et al.

(10) Patent No.: US 9,385,902 B2
(45) Date of Patent: Jul. 5, 2016

(54) APPARATUS AND METHOD FOR TRANSMITTING TAG

(71) Applicant: ELECTRONICS AND TELECOMMUNICATIONS RESEARCH INSTITUTE, Daejeon (KR)

(72) Inventors: Sang Hyun Mo, Daejeon (KR); Kyu Won Han, Daejeon (KR); Chan-Won Park, Daejeon (KR); Hyochan Bang, Daejeon (KR); Dong-Beom Shin, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/698,771

(22) Filed: Apr. 28, 2015

(65) Prior Publication Data
US 2015/0312072 A1    Oct. 29, 2015

(30) Foreign Application Priority Data

| Apr. 29, 2014 | (KR) | 10-2014-0051881 |
| Sep. 18, 2014 | (KR) | 10-2014-0124504 |
| Apr. 8, 2015  | (KR) | 10-2015-0049891 |

(51) Int. Cl.
H04L 27/20   (2006.01)
H04W 72/04   (2009.01)
H04W 4/00    (2009.01)

(52) U.S. Cl.
CPC ........... *H04L 27/2035* (2013.01); *H04W 4/008* (2013.01); *H04W 72/0453* (2013.01)

(58) Field of Classification Search
CPC ........... H04L 27/2035; H04L 72/0453; H04L 27/2057; H04L 27/2614; H04L 5/0048; H04B 5/02; H04B 7/04
USPC ................ 375/279–280, 282, 285, 302, 308; 370/215; 340/870.18, 870.25
See application file for complete search history.

(56) References Cited

U.S. PATENT DOCUMENTS

| 8,064,541 B1 * | 11/2011 | Caldwell | H04L 27/2057 375/308 |
| 2005/0283705 A1 * | 12/2005 | McNamara | H03M 13/25 714/755 |
| 2006/0227892 A1 * | 10/2006 | Ouyang | H04B 7/04 375/267 |
| 2007/0188305 A1 * | 8/2007 | Drucker | G06K 7/10039 340/10.4 |
| 2008/0267279 A1 | 10/2008 | Okunev | |
| 2008/0278293 A1 * | 11/2008 | Drucker | G06K 7/0008 340/10.4 |

(Continued)

FOREIGN PATENT DOCUMENTS

KR   10-2009-0116853 A   11/2009

OTHER PUBLICATIONS

"Proposal for development of High-speed RFID standard", IoT Convergnece Research Department, Jun. 24, 2014, pp. 1-24, ETRI.

*Primary Examiner* — Khanh C Tran

(57) ABSTRACT

Disclosed are an apparatus and a method for transmitting a tag. The apparatus for transmitting a tag converts 2 bits of a plurality of bit data into one symbol using phase information and orthogonal information. The apparatus for transmitting a tag generates a sub-carrier signal by multiplying the symbol by a square wave having a faster period by a predetermined number of times than a period of the symbol, and transmits the sub-carrier signal to a reader

18 Claims, 16 Drawing Sheets

(56) References Cited

U.S. PATENT DOCUMENTS

| | | | | |
|---|---|---|---|---|
| 2009/0219801 A1* | 9/2009 | Jeong | | H04L 5/0048 370/210 |
| 2010/0046361 A1* | 2/2010 | Jeong | | H04L 27/2614 370/210 |
| 2010/0156610 A1* | 6/2010 | Wild | | G06K 7/0008 340/10.34 |
| 2013/0106580 A1 | 5/2013 | Bae et al. | | |
| 2013/0162401 A1 | 6/2013 | Bae et al. | | |
| 2013/0210345 A1* | 8/2013 | Ling | | H04B 5/02 455/41.1 |

* cited by examiner

FIG. 12

| index | Payload | | | | | dummy | CRC-m | | | | End-of-signaling |
|---|---|---|---|---|---|---|---|---|---|---|---|
| | n-1 | n-2 | ... | 1 | 0 | | m-1 | m-2 | ... | 0 | |
| n : odd<br>m : 16 | D[n-1] | D[n-2] | ... | D[1] | D[0] | dummy bit 0 | D[m-1] | D[m-2] | ... | C[0] | Sym-0 |
| n : even<br>m : 16 | D[n-1] | D[n-2] | ... | D[1] | D[0] | ✕ | D[m-1] | D[m-2] | ... | C[0] | Sym-1 |

APPARATUS AND METHOD FOR TRANSMITTING TAG

CROSS-REFERENCE TO RELATED APPLICATION

This application claims priority to and the benefit of Korean Patent Application No. 10-2014-0051881, 10-2014-0124504 and 10-2015-0049891 filed in the Korean Intellectual Property Office on Apr. 29, 2014, Sep. 18, 2014, and Apr. 8, 2015, the entire contents of which are incorporated herein by reference.

BACKGROUND OF THE INVENTION (a) Field of the Invention

The present invention relates to an apparatus and a method for transmitting a tag.

(b) Description of the Related Art

In a passive RFID system, a tag having target information does not have power and a device for controlling a wireless signal. Accordingly, the tag constituting the passive RFID system receives a carrier signal in a wireless environment from a reader to generate power, and communicates with the reader based on backscattering. Since the above passive RFID system may provide information on a separate target, has a high recognition distance as compared with a barcode, and may simultaneously recognize a plurality of tags, the passive RFID system has been used in various fields.

In recent years, the RFID system has been used to manage components in airline, vehicle, ship building, and steel fields. The RFID system requires read/write of large capacity data at a high speed using a tag user memory of 32 Kbyte or greater or 64 Kbyte or greater. Further, there is a need for a technology for recognizing an object which is moved at a high speed in train and conveyor application fields.

However, there are limitations to satisfy the requirements due to low transmission speed of data as an existing passive RFID technology.

A Miller encoding scheme in an ISO/IEC 18000-63 standard which is an international standard has been proposed. In the existing Miller encoding scheme, as a Miller subcarrier, a total of 4 types of waveforms are generated. However, each waveform is transmitted by allocating one bit to each waveform. For example, S1(t) and S3(t) having different phases may generate different Miller sub-carriers, but transmit only one bit. Accordingly, data transmission speed is low.

SUMMARY OF THE INVENTION

The present invention has been made in an effort to provide an apparatus and a method for transmitting a tag having advantages of transmitting a tag signal at high speed.

An exemplary embodiment of the present invention provides a method for transmitting a plurality of bit data by a tag transmitting apparatus. The method including: converting 2 bits of the plurality of bit data into one symbol using phase information and orthogonal information; generating a sub-carrier signal by multiplying the symbol by a square wave having a faster period by a predetermined number of times than a period of the symbol; and transmitting the sub-carrier signal to a reader.

The converting of the 2 bits of the plurality of bit data may include converting the 2 bits of the plurality of bit data into the one symbol using first to fourth basis functions, wherein the first basis function and the fourth basis function may have opposite phases, the second basis function and the third basis function may have opposite phases, the first basis function and the second basis function may be orthogonal to each other.

The predetermined number of times may include twice, four times, or eight times.

The method may further include inserting a dummy bit into a bit of the effective data when the bit number of the effective data among the plurality of bit data is odd.

The dummy bit may be 1 bit.

The reader may perform a cyclic redundancy check (CRC) by taking the dummy bit into consideration.

The method may further include inserting an end of signaling indicating whether the bit number of effective data among the plurality of bit data is odd or even into the plurality of bit data.

Another embodiment of the present invention provides a method for transmitting a plurality of bit data by a tag transmitting apparatus, the method including: converting 2 bits of the plurality of bit data into a first symbol using phase information and orthogonal information; converting 2 bits of the plurality of bit data into a second symbol using the phase information and the orthogonal information; separating the first symbol from the second symbol; generating a first sub-carrier signal by multiplying the separated first symbol by a square wave having a first link frequency; generating a second sub-carrier signal by multiplying the separated second symbol by a square wave having a second link frequency; transmitting the first sub-carrier signal to a reader through a first antenna; and transmitting the second sub-carrier signal to the reader through a second antenna.

The first link frequency may be double the second link frequency.

A preamble may be transmitted through one of the first sub-carrier signal and the second sub-carrier signal.

The one sub-carrier signal may be a sub-carrier signal having a higher frequency than the first sub-carrier signal and the second sub-carrier signal.

The converting of the 2 bits of the plurality of bit data into a first symbol may include converting the 2 bits of the plurality of bit data into the first symbol using first to fourth basis functions, the converting of the 2 bits of the plurality of bit data into a second symbol may include converting the 2 bits of the plurality of bit data into the second symbol using first to fourth basis functions, the first basis function and the fourth basis function may have opposite phases, the second basis function and the third basis function may have opposite phases, and the first basis function and the second basis function may be orthogonal to each other.

The method may further include inserting a dummy bit after a payload of the second sub-carrier when the bit number of effective data among the plurality of bit data is odd.

The first sub-carrier signal and the second sub-carrier signal may include an end of signaling indicating whether the bit number of effective data among the plurality of bit data is odd or even, respectively.

Yet another embodiment of the present invention provides an apparatus for transmitting a tag. The apparatus for transmitting a tag includes: a data signal generator to generate a plurality of bit data; a bit-symbol converter to convert 2 bits of the plurality of bit data into one symbol using phase information and orthogonal information; a first sub-carrier generator to generate a first sub-carrier signal by multiplying the first symbol by a square wave having a first link frequency; and a first load modulator to modulate the first sub-carrier signal.

The bit-symbol converter may convert the 2 bits of the plurality of bit data into the one symbol using first to fourth basis functions, wherein the first basis function and the fourth basis function may have opposite phases, the second basis function and the third basis function may have opposite phases, and the first basis function and the second basis function may be orthogonal to each other.

The bit-symbol converter converts 2 bits of the plurality of data into one second symbol, and the apparatus further includes a demultiplexer to divide the first symbol and the second symbol in parallel, a second sub-carrier generator to generate a second sub-carrier signal by multiplying the second symbol by a square wave having a second link frequency, and a second load modulator to modulate the second sub-carrier signal.

The first link frequency may be double the second link frequency.

A preamble may be transmitted through a sub-carrier signal having a higher frequency than the first sub-carrier signal and the second sub-carrier signal.

The data signal generator may insert a dummy bit into a bit of the effective data when the bit number of the effective data of the plurality of bit data is odd.

According to an exemplary embodiment of the present invention, the tag signal may be transmitted by converting a plurality of bits into a symbol using orthogonal information and phase information.

BRIEF DESCRIPTION OF THE DRAWINGS

FIG. 12 is a diagram illustrating a CRC operation method in a high speed Miller encoding scheme according to an exemplary embodiment of the present invention.

DETAILED DESCRIPTION OF THE EMBODIMENTS

Figure 1:
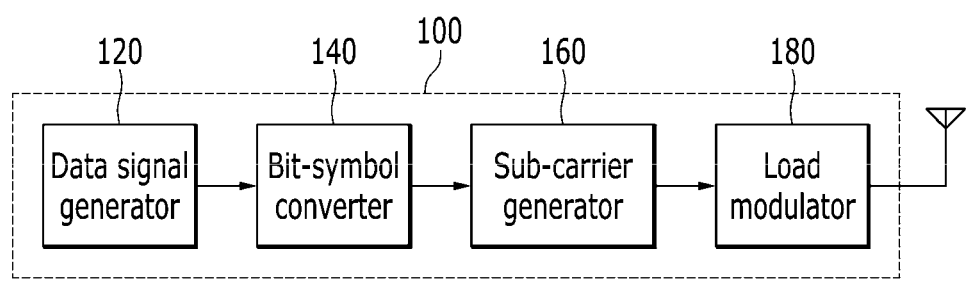
FIG. 1 is a block diagram illustrating an apparatus for transmitting a tag according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

An apparatus for transmitting a tag according to an exemplary embodiment of the present invention generates a tag signal by applying a bi-orthogonal signal-based encoding scheme, and may accordingly transmit the tag signal at a high speed. The bi-orthogonal signal-based encoding scheme according to an exemplary embodiment of the present invention may ensure higher speed than the Miller encoding scheme. Hereinafter, for the purpose of convenience, the bi-orthogonal signal-based encoding scheme is referred to as a 'High Speed (HS) Miller encoding scheme'. Hereinafter, an apparatus and a method for transmitting a tag according to an exemplary embodiment of the present invention will be described in detail.

FIG. 1 is a block diagram illustrating an apparatus for transmitting a tag according to an exemplary embodiment of the present invention.

As shown in FIG. 1, the apparatus 100 for transmitting a tag according to an exemplary embodiment of the present invention includes a data signal generator 120, a bit-symbol converter 140, a sub-carrier generator 160, and a load modulator 180. The apparatus 100 for transmitting a tag according to an exemplary embodiment of the present invention shown in FIG. 1 uses a single load modulator and a single antenna.

The data signal generator 120 generates bit data including a preamble and effective data (i.e., a payload). Further, the bit-symbol converter 140 combines and converts a plurality of bit data generated from the data signal generator 120 into a symbol. The symbol generated by the bit-symbol converter 140 corresponds to a basis function to be described below.

The sub-carrier generator 160 generates a sub-carrier signal by multiplying the symbol signal (i.e., basis function) generated from the bit-symbol converter 140 by a square wave signal having a predetermined frequency. The sub-carrier generator 160 according to an exemplary embodiment of the present invention generates a high speed Miller sub-carrier signal. The high speed Miller sub-carrier signal will be described in detail below.

The load modulator 180 backscatters the sub-carrier signal generated from the sub-carrier generator 160 through an antenna using Amplitude Shift Keying (ASK) modulation or Phase Shift Keying (PSK) modulation.

Figure 2:
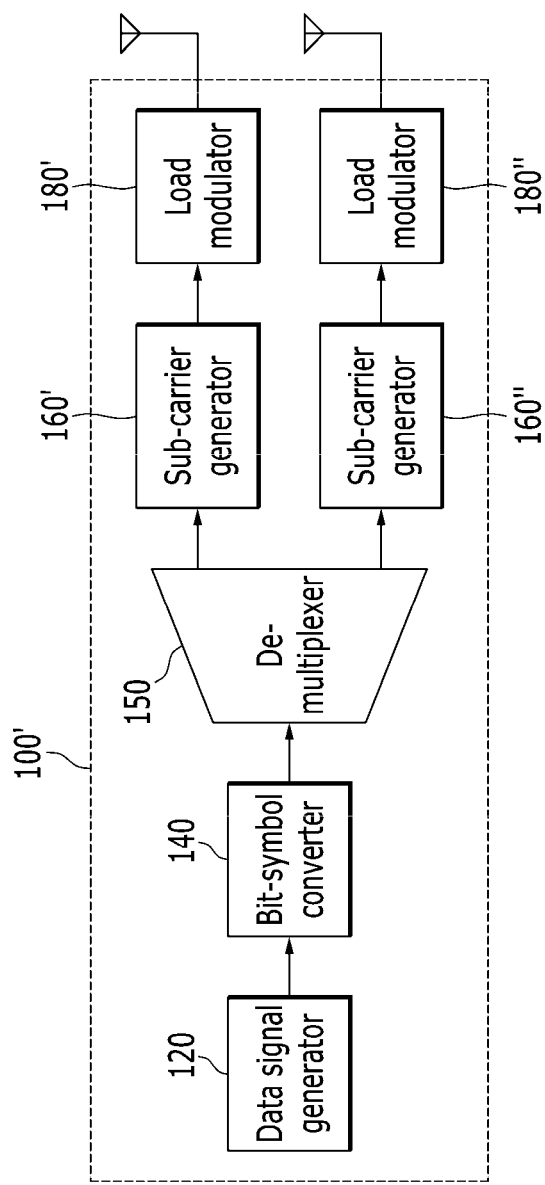
FIG. 2 is a block diagram illustrating an apparatus for transmitting a tag according to another exemplary embodiment of the present invention.

FIG. 2 is a block diagram illustrating an apparatus for transmitting a tag according to another exemplary embodiment of the present invention.

As shown in FIG. 2, the apparatus 100' for transmitting a tag according to another exemplary embodiment of the present invention includes a data signal generator 120, a bit-symbol converter 140, a demultiplexer 150, two sub-carrier generators 160' and 160", and two load modulators 180' and 180". The apparatus 100' for transmitting a tag of FIG. 2 further includes the demultiplexer 150 for multiple modulation. The apparatus 100' for transmitting a tag of FIG. 2 is the same as the tag transmitting apparatus 100 of FIG. 1, except for the two sub-carrier generators 160' and 160" and the two load modulators 180' and 180". That is, the demultiplexer 150 divides the symbol signal generated from the bit-symbol converter 140 in parallel, and the symbol signal divided in parallel is input to two sub-carrier generators 160' and 160", respectively. Meanwhile, the sub-carrier generators 160' and 160" generates a high speed Miller sub-carrier signal by multiplying the symbol signal divided in parallel by a square wave having a predetermined frequency. In this case, a link frequency of the sub-carrier generator 160' may be different from a link frequency of the sub-carrier generator 160".

Hereinafter, the high speed Miller encoding scheme according to an exemplary embodiment of the present invention will be described in detail.

Figure 3:
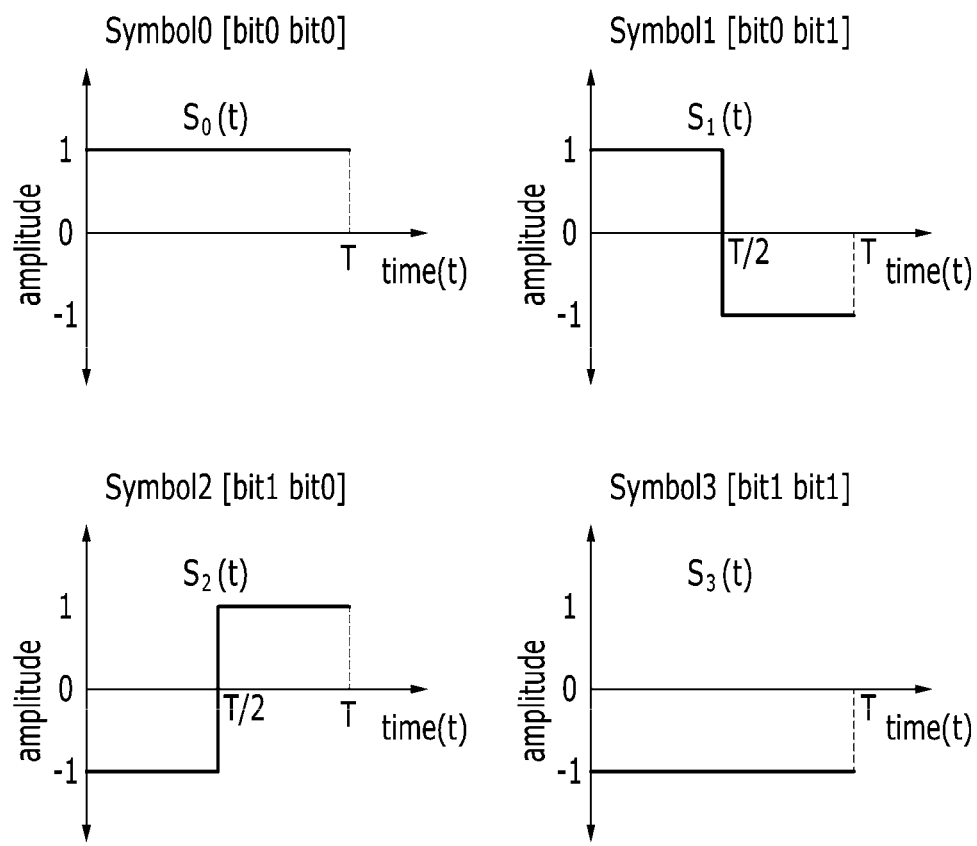
FIG. 3 illustrates a basis function used in a high speed Miller encoding scheme according to an exemplary embodiment of the present invention.

FIG. 3 illustrates a basis function used in a high speed Miller encoding scheme according to an exemplary embodiment of the present invention.

As shown in FIG. 3, high speed Miller encoding according to an exemplary embodiment of the present invention uses four different types of basis functions, and maps two-bit data to one high speed Miller symbol. When 2 bits are [bit0, bit0], a symbol is mapped to a basis function $S_0(t)$, and when bit data are [bit0, bit1], the symbol is mapped to a basis function $S_1(t)$. Further, when the bit data are [bit1, bit0], the symbol is mapped to a basis function $S_2(t)$, and when the bit data are [bit1, bit1], the symbol is mapped to a basis function $S_3(t)$. In this way, the high speed Miller encoding according to an exemplary embodiment of the present invention encodes bit data using both phase and orthogonality information, unlike existing Miller encoding. As shown in FIG. 3, $S_3(t)=-S_0(t)$ and $S_2(t)=-S_1(t)$, and phase information is used. That is, the high speed (HS) Miller encoding encodes data based on a bi-orthogonal signal. An order of the symbol mapping according to the bit data may be changed according to the implementation scheme, unlike FIG. 4. The high speed Miller encoding is performed by the bit-symbol converter 140 of FIG. 1 and FIG. 2.

Figure 4:
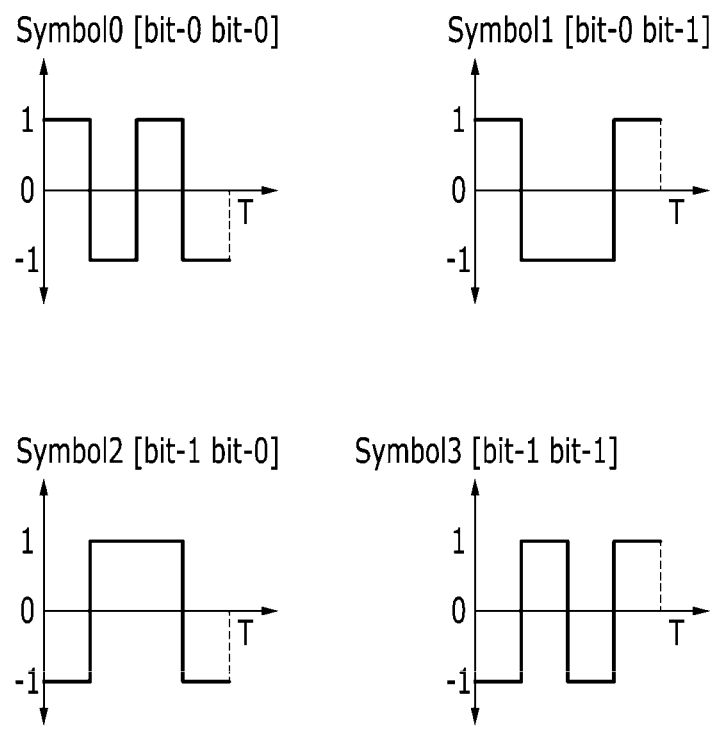
FIG. 4 to FIG. 6 are diagrams illustrating a high speed Miller sub-carrier signal according to an exemplary embodiment of the present invention.
Figure 5:
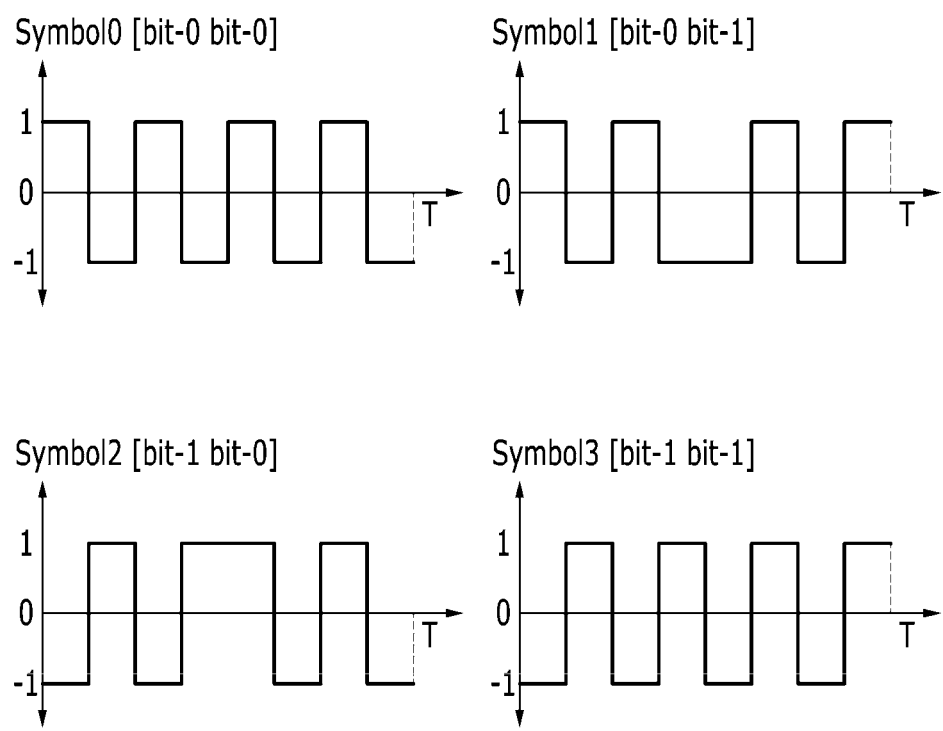
Figure 6:
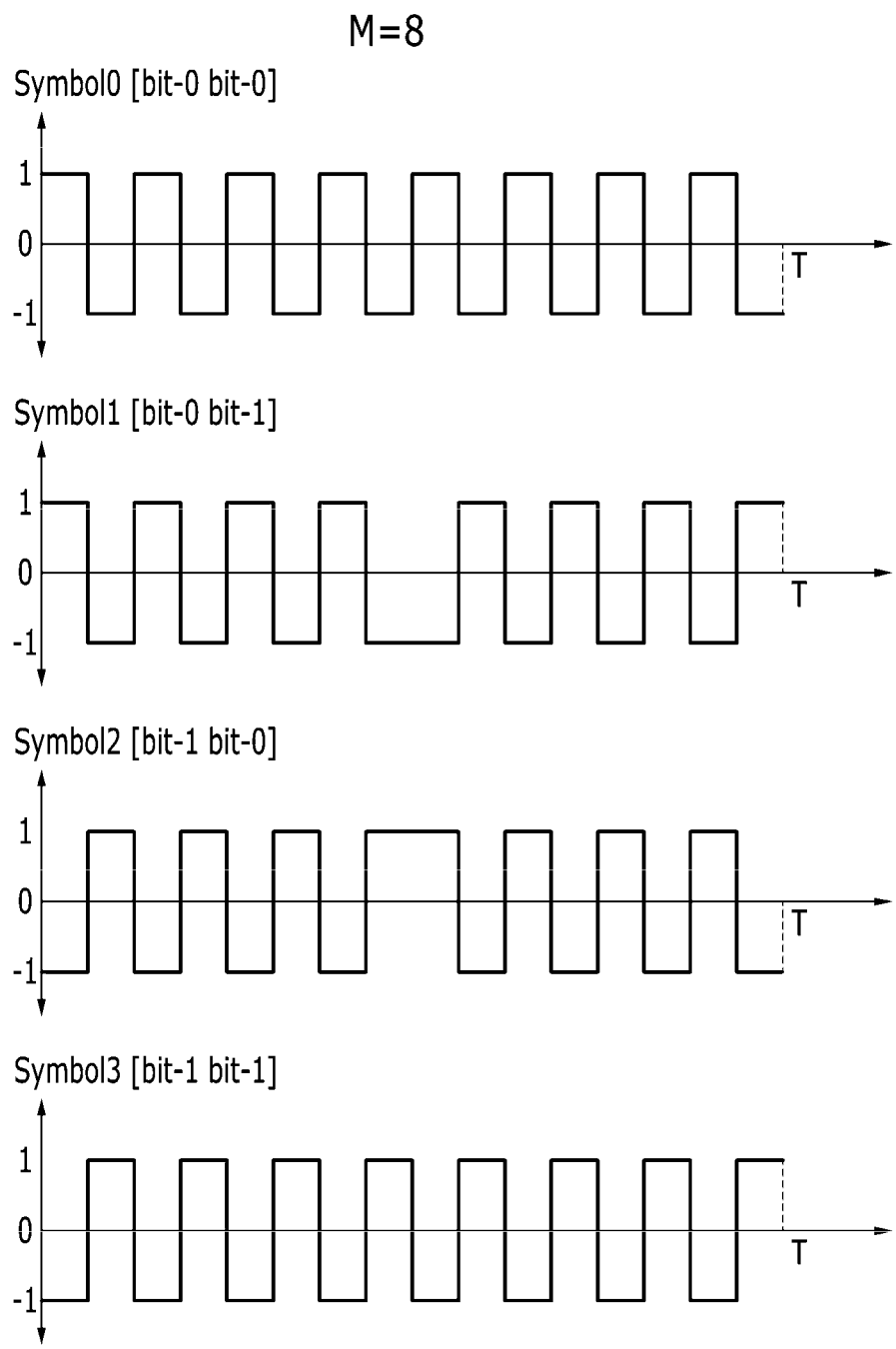

FIG. 4 to FIG. 6 are diagrams illustrating a high speed Miller sub-carrier signal according to an exemplary embodiment of the present invention.

The sub-carrier generators 160, 160', and 160" multiply high speed Miller encoding signal mapped to the basis function by a square wave having a frequency corresponding to M times a symbol rate according to a symbol. A signal finally generated by the sub-carrier generators (160, 160', and 160") is the high speed (HS) Miller sub-carrier signal.

A value of the M used in the high speed Miller sub-carrier signal may be 2, 4, or 8. FIG. 4 to FIG. 6 illustrate the high speed Miller sub-carrier signal according to the M value and corresponding transmission bit data.

Referring to FIG. 4, when the value of the M is 2, the high speed Miller sub-carrier signal is generated by multiplication of a square wave of 2 periods during a symbol period T. Referring to FIG. 5, when the value of the M is 4, the Miller sub-carrier signal is generated by multiplication of a square wave of 4 periods during a symbol period T. Further, referring to FIG. 6, when the value of the M is 8, the high speed Miller sub-carrier signal is generated by a square wave of 8 periods during a symbol period T.

In this way, since the high speed Miller sub-carrier signal according to an exemplary embodiment of the present invention does not have DC components, the high speed Miller sub-carrier signal has a characteristic that it is robust to DC-offset noise. Moreover, since the Miller sub-carrier signal having two bits according to an exemplary embodiment of the present invention is mapped per symbol, data may be transmitted to the reader at a speed that is twice as fast as that of an existing Miller sub-carrier signal.

Figure 7:
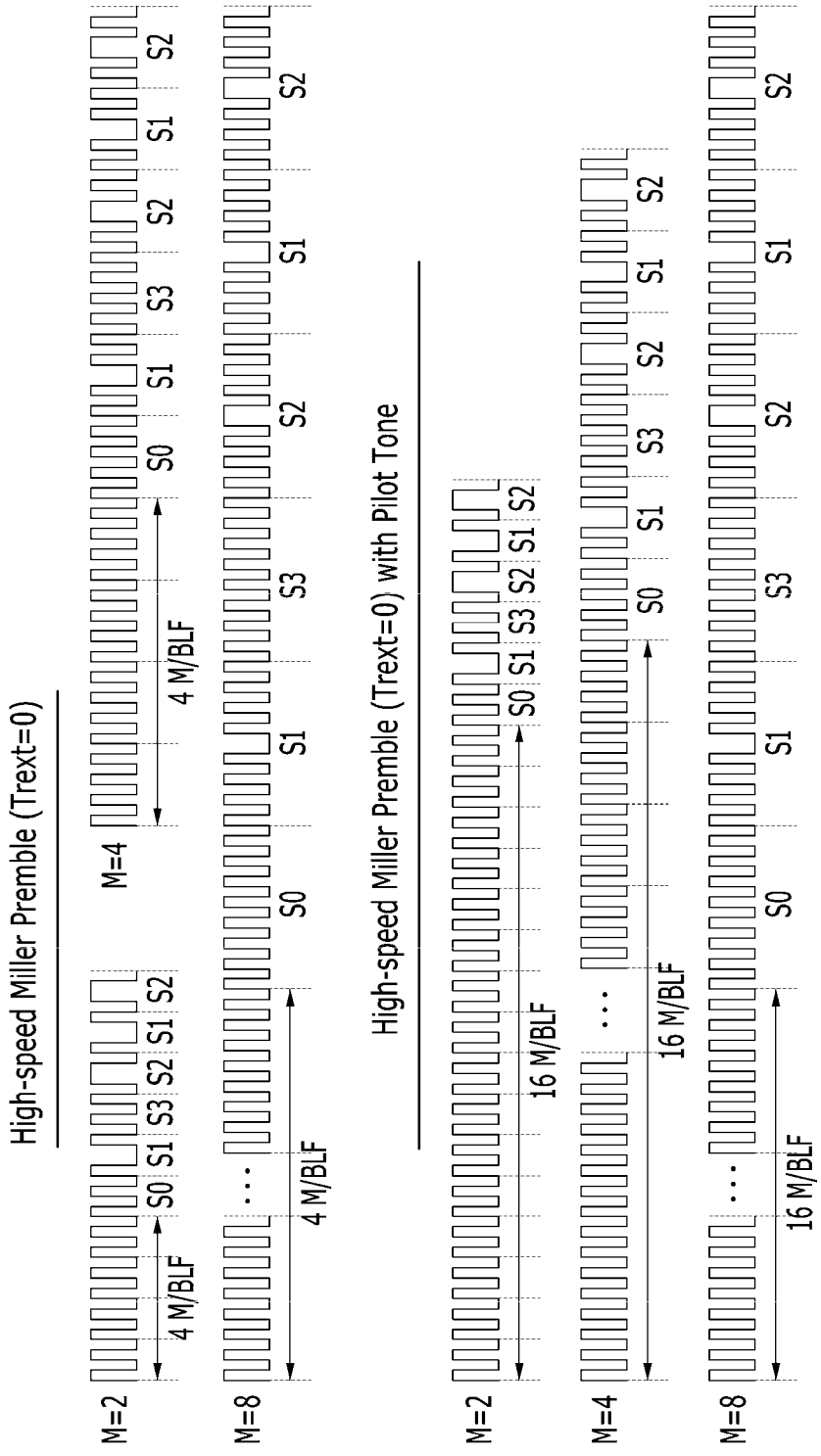
FIG. 7 is a diagram illustrating a method of transmitting a preamble using one high speed Miller sub-carrier according to an exemplary embodiment of the present invention.

FIG. 7 is a diagram illustrating a method of transmitting a preamble using one high speed Miller sub-carrier according to an exemplary embodiment of the present invention.

As shown in FIG. 7, the apparatus 100 or 100' for transmitting a tag transmits a preamble to a reader by attaching one of two types of preambles in front of payload data. The preamble structure is similar to an existing Miller sub-carrier. However, in a case of an exemplary embodiment of the present invention, an encoding scheme is different from the existing scheme, and 6 symbols {S0, S1, S3, S2, S1, and S2} are used. That is, the existing Miller sub-carrier scheme uses 6 bits {0, 1, 0, 1, 1, 1}, but a preamble according to an exemplary embodiment of the present invention uses 6 symbols {S0, 51, S3, S2, S1, and S2}.

Figure 8:
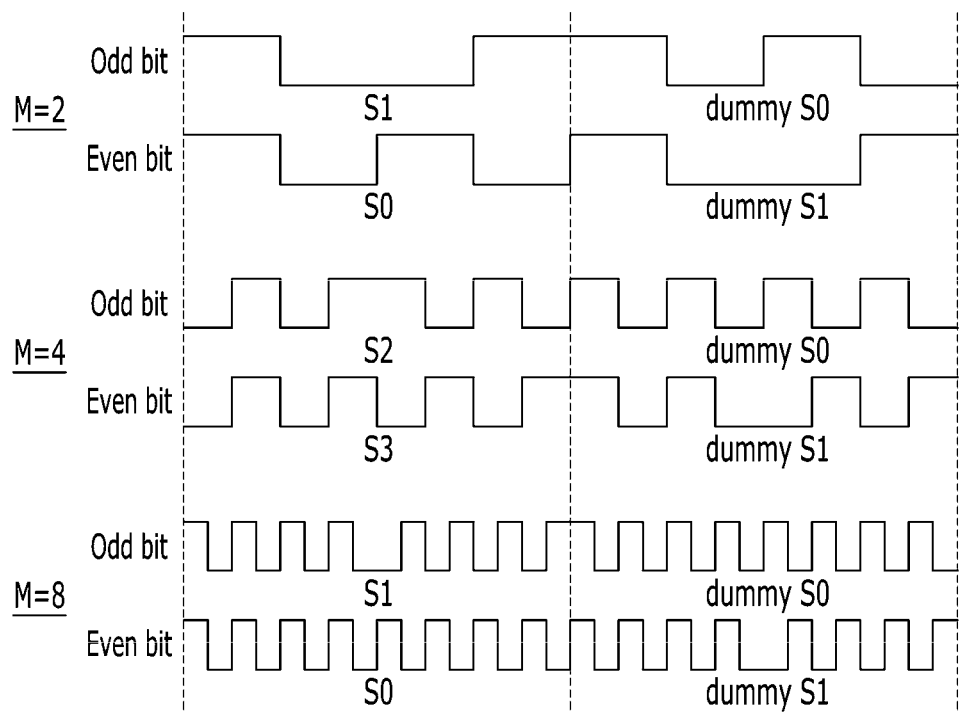
FIG. 8 is a diagram illustrating end of signaling in the high speed Miller encoding scheme according to an exemplary embodiment of the present invention.

FIG. 8 is a diagram illustrating an end of signaling in the high speed Miller encoding scheme according to an exemplary embodiment of the present invention. FIG. 8 illustrates an example of an end of signaling with respect to a case where the value of M is 2, 4, or 8.

The Miller encoding scheme according to an exemplary embodiment of the present invention transmits two bits during one symbol period. Accordingly, there is a need to display whether the number of bits of the apparatus for transmitting a tag with respect to a reader command is an odd bit or an even bit. That is, the Miller encoding scheme displays whether an end of signaling according to an exemplary embodiment of the present invention is an odd bit or an event bit. In more detail, the end of signaling according to an exemplary embodiment of the present invention displays whether the number of bits of effective data except for a Cyclic Redundancy Check (CRC) bit is odd or even.

As shown in FIG. 8, a 'dummy $S_0$' may be used as an end of signaling which defines an odd bit, and a 'dummy $S_1$' may be used as an end of signaling which defines an even bit. A symbol mapping method with respect to the end of signaling according to an odd or even bit may be changed according to an implementation scheme.

The end of signaling illustrated in FIG. 8 may be generated by the data signal generator 120 illustrated in FIG. 1 and FIG. 2.

Figure 9:
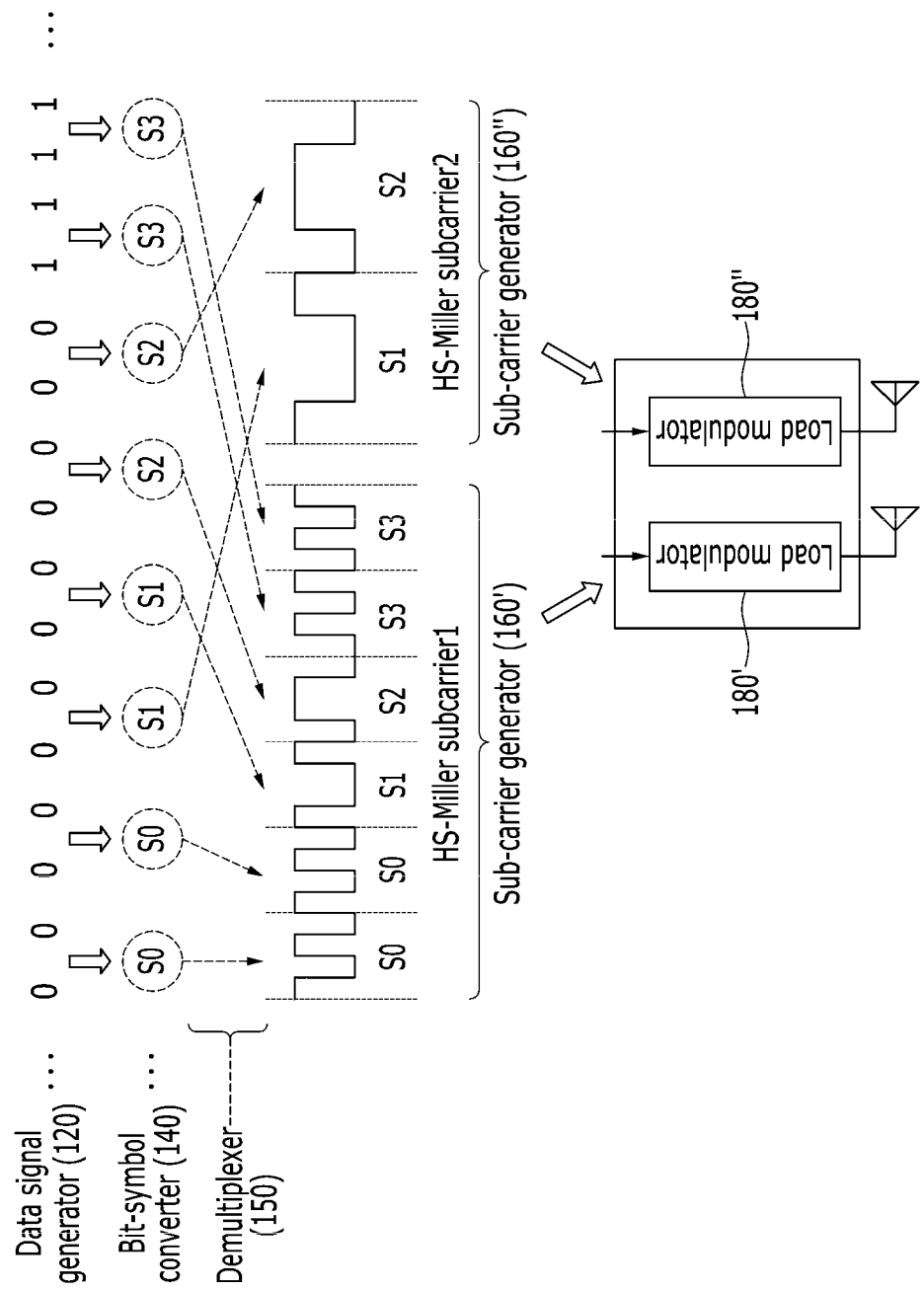
FIG. 9 is a diagram illustrating a method for transmitting a tag signal using two high speed (HS) Miller sub-carrier signals.

FIG. 9 is a diagram illustrating a method for transmitting a tag signal using two high speed (HS) Miller sub-carrier signals. That is, FIG. 9 illustrates a method for transmitting a tag signal using two load modulators and antennas after the apparatus 100' for transmitting a tag of FIG. 2 generates two high speed Miller sub-carrier signals in a multiplexing scheme.

The bit data generated from the data signal generator 120 are mapped to one symbol per 2 bits. That is, the bit-symbol converter 140 maps one symbol (S0-S3) per 2 bits, and accordingly a basis function shown in FIG. 3 is generated. The demultiplexer 150 divides the mapped symbol in parallel by multiplexing the mapped symbol, and transmits the mapped symbol divided in parallel to the carrier generator 160' and the sub-carrier generator 160". The sub-carrier generator 160' generates the high speed (HS) Miller sub-carrier 1 by multiplying the basis function by a square wave having a first link frequency. Moreover, the sub-carrier generator 160" finally generates a high speed (HS) Miller sub-carrier 2 by multiplying the basis function by a square wave having a second link frequency. The first link frequency and the second link frequency may be different link frequencies. As shown in FIG. 9, when generating the high speed Miller sub-carrier 1 using a link frequency that is twice that of the high speed Miller sub-carrier 2, orthogonality between two sub-carrier signals is satisfied. Accordingly, although the reader receives two sub-carrier signals, performance degradation according to mutual interference may be prevented.

Figure 10:
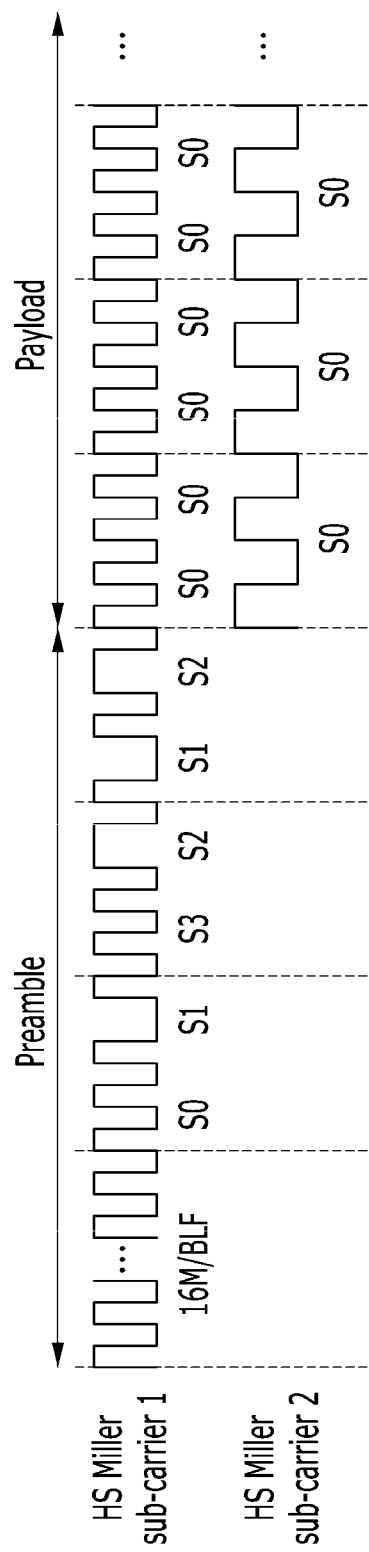
FIG. 10 and FIG. 11 are diagrams illustrating a method for transmitting a preamble using two high speed (HS) Miller sub-carrier signals.
Figure 11:
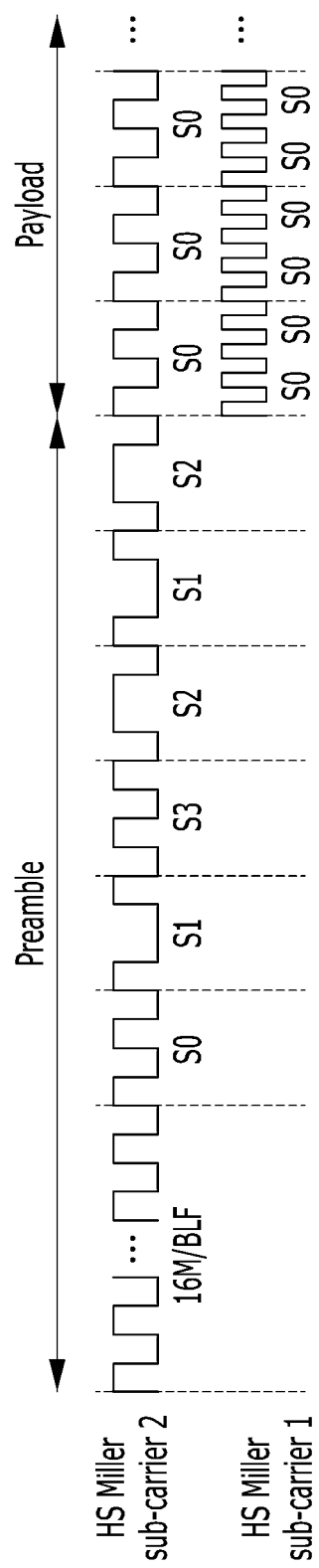

FIG. 10 and FIG. 11 are diagrams illustrating a method for transmitting a preamble using two high speed (HS) Miller sub-carrier signals.

As shown in FIG. 9, when two high speed Miller sub-carriers are used, a preamble may be transmitted through one sub-carrier signal of two high speed Miller sub-carriers. As shown in FIG. 10, the preamble may be transmitted through a sub-carrier (HS Miller sub-carrier 1) having a high link frequency of the two high speed Miller sub-carriers. In addition, as shown in FIG. 11, the preamble may be transmitted through a sub-carrier (HS Miller sub-carrier 2) having a low link frequency of the two high speed Miller sub-carriers.

As shown in FIG. 10 and FIG. 11, the preamble is transmitted in a state that the preamble is disposed before a payload signal, the payload signal is synchronized when transmission of the preamble is terminated, and is transmitted through one high speed Miller sub-carrier signal of the two high speed Miller sub-carrier signals.

Hereinafter, a method of operating a cyclic redundancy check (CRC) in a high speed Miller encoding scheme according to an exemplary embodiment of the present invention will be described.

As described above, the high speed Miller encoding scheme according to an exemplary embodiment of the present invention transmits two bits per symbol. Accordingly, when the bit number (i.e., effective data) of a transmission frame is odd, one dummy bit is added and transmitted. The dummy bit may be generated by the data signal generator 120 illustrated in FIG. 1 and FIG. 2. Due to the above dummy bit, there is a need for a following CRC operation method in the high speed Miller encoding scheme according to an exemplary embodiment of the present invention.

FIG. 12 is a diagram illustrating a CRC operation method in a high speed Miller encoding scheme according to an exemplary embodiment of the present invention. That is, FIG. 12 illustrates the CRC operation method according to the payload bit number.

The first case illustrates m:16 when the payload bit number is odd (i.e., n:odd) and the number of CRC bits is 16. In the above case, since the payload bit number transmitted from the apparatus 100 or 100' for transmitting a tag is odd, the apparatus 100 or 100' adds a dummy bit 0 and transmits the dummy bit 0 together with the 16 CRC bits. In this case, as illustrated in FIG. 8, the apparatus 100 or 100' for transmitting a tag according to an exemplary embodiment of the present invention finally transmits a symbol $S_0$ (Sym-0) as an end of signaling in order to identify that the effective bit data number is odd. A reader receiving a signal from the apparatus 100 or 100' for transmitting a tag may determine whether a payload bit number is odd through the end of signaling, and performs the CRC operation by taking into consideration the dummy bit 0.

The second case illustrates m:16 when the payload bit number is even (i.e., n:even) and the number of CRC bits is 16. In the above case, since the payload bit number transmitted from the apparatus 100 or 100' for transmitting a tag is even, the apparatus 100 or 100' does not add the dummy bit 0 and transmits the 16 CRC bits together. In this case, as illustrated in FIG. 8, the apparatus 100 or 100' for transmitting a tag according to an exemplary embodiment of the present invention finally transmits a symbol $S_1$ (Sym-1) as an end of signaling in order to identify that the effective bit data number is even. A reader receiving a signal from the apparatus 100 or 100' for transmitting a tag may determine whether a payload bit number is even through the end of signaling, and performs the CRC operation by taking into consideration the dummy bit 0.

FIG. 12 illustrates that a data 0 is used as a dummy bit, but the dummy bit may use a data 1. Further, as illustrated in FIG. 8, the end of signaling may be changed according to the symbol used according to the implementation scheme.

FIG. 13A to FIG. 13D are diagrams illustrating examples of a signal transmitted by the high speed Miller encoding scheme according to an exemplary embodiment of the present invention.

Figure 13A:
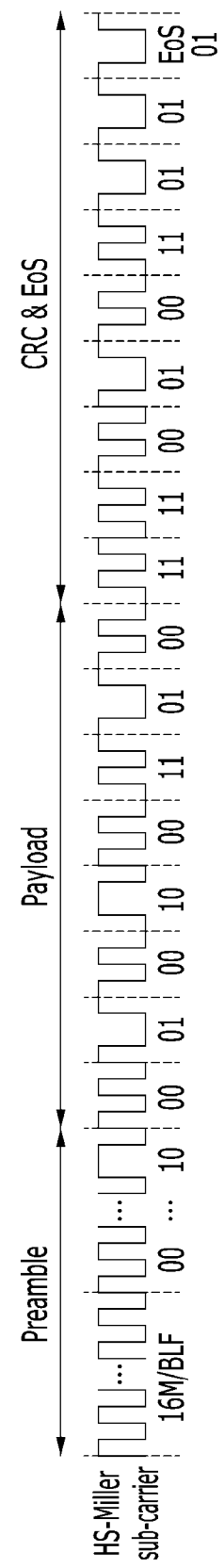
FIG. 13A to FIG. 13D are diagrams illustrating examples of a signal transmitted by the high speed Miller encoding scheme according to an exemplary embodiment of the present invention.
Figure 13B:
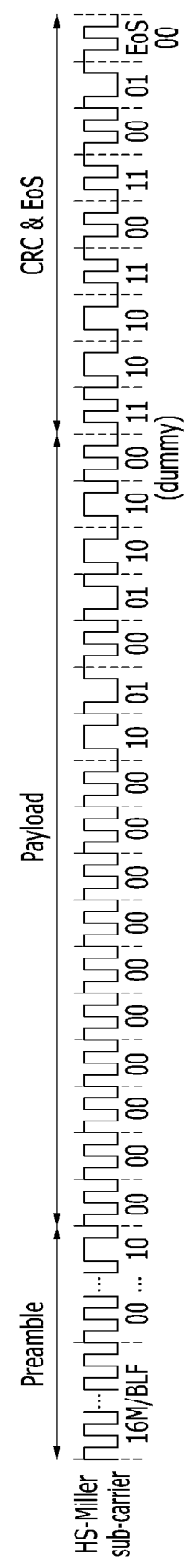
Figure 13C:
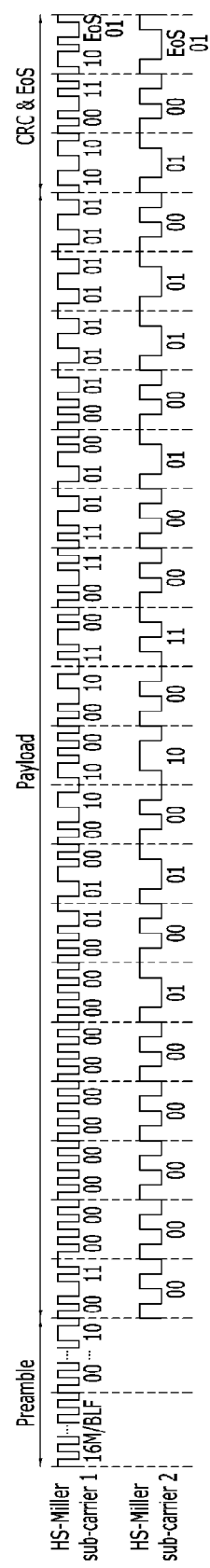
Figure 13D:
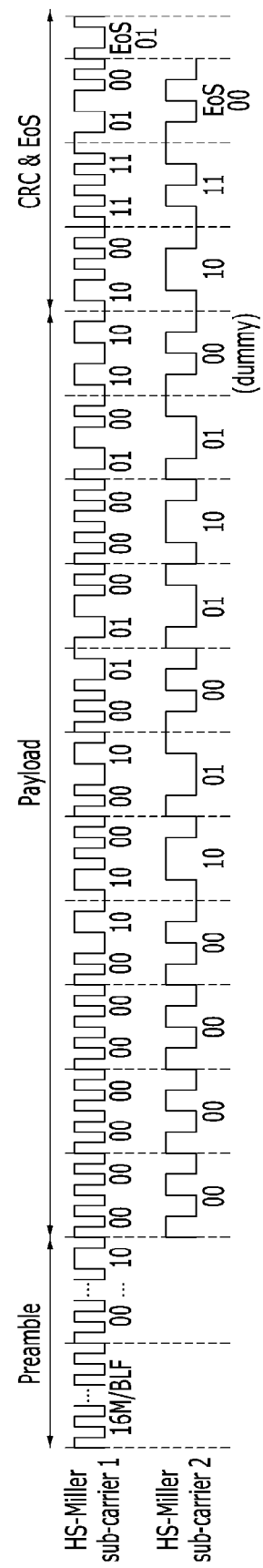

FIG. 13A and FIG. 13B illustrate a case of using one high speed Miller sub-carrier, and FIG. 13C and FIG. 13D illustrate a case of using two high speed Miller sub-carriers.

As shown in FIG. 13A, since effective data in the payload is even, it is unnecessary to insert the dummy bit 0. In addition, since the effective data are even, a dummy $S_1$ 01 is used as the end of signaling EoS.

As shown in FIG. 13B, since the effective data in the payload is odd, a dummy bit 0 is added after the payload. Moreover, since the effective data is odd, a dummy $S_0$ 00 is used as the end of signaling EoS.

As shown in FIG. 13C, although two high Miller sub-carriers are used, since the effective data in the payload is even, it is unnecessary to insert the dummy bit 0. Further, since the effective data in the payload is even, a dummy $S_1$ 01 is used as the end of signaling EoS in both of the two sub-carrier signals.

Meanwhile, as shown in FIG. 13D, when two high speed Miller sub-carriers are used and effective data in the payload is odd, a dummy bit 0 is added. In this case, a dummy bit 0 is added after a payload of the high speed Miller sub-carrier 2. In a case of the high speed Miller sub-carrier 1, since the payload is even, the dummy $S_1$ 01 is used as the end of signaling EoS. Moreover, in a case of the high speed Miller sub-carrier 2, since the payload is odd, the dummy $S_0$ 00 is used as the end of signaling EoS.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for transmitting a plurality of bit data by a tag transmitting apparatus, the method comprising:
    converting 2 bits of the plurality of bit data into one symbol using phase information and orthogonal information;
    generating a sub-carrier signal by multiplying the symbol by a square wave having a faster period by a predetermined number of times than a period of the symbol; and
    transmitting the sub-carrier signal to a reader,
    wherein the method further comprises adding a dummy bit to effective data of the plurality of bit data when a bit number of the effective data is odd.

2. The method of claim 1, wherein the converting of the 2 bits of the plurality of bit data comprises converting the 2 bits of the plurality of bit data into the one symbol using first to fourth basis functions,
    wherein the first basis function and the fourth basis function have opposite phases, the second basis function and the third basis function have opposite phases, and the first basis function and the second basis function are orthogonal to each other.

3. The method of claim 1, wherein the predetermined number of times comprises twice, four times, or eight times.

4. The method of claim 1, wherein the dummy bit is 1 bit.

5. The method of claim 1, wherein the reader performs a cyclic redundancy check (CRC) by taking the dummy bit into consideration.

6. The method of claim 1, further comprising inserting an end of signaling indicating whether the bit number of effective data among the plurality of bit data is odd or even into the plurality of bit data.

7. A method for transmitting a plurality of bit data by a tag transmitting apparatus, the method comprising:
   converting 2 bits of the plurality of bit data into a first symbol using phase information and orthogonal information;
   converting 2 bits of the plurality of bit data into a second symbol using the phase information and the orthogonal information;
   separating the first symbol from the second symbol;
   generating a first sub-carrier signal by multiplying the separated first symbol by a square wave having a first link frequency;
   generating a second sub-carrier signal by multiplying the separated second symbol by a square wave having a second link frequency;
   transmitting the first sub-carrier signal to a reader through a first antenna; and
   transmitting the second sub-carrier signal to the reader through a second antenna.

8. The method of claim 7, wherein the first link frequency is double the second link frequency.

9. The method of claim 7, wherein a preamble is transmitted through one of the first sub-carrier signal and the second sub-carrier signal.

10. The method of claim 9, wherein the one sub-carrier signal is a sub-carrier signal having a higher frequency of the first sub-carrier signal and the second sub-carrier signal.

11. The method of claim 7, wherein the converting of the 2 bits of the plurality of bit data into the first symbol comprises converting the 2 bits of the plurality of bit data into the first symbol using first to fourth basis functions,
   the converting of the 2 bits of the plurality of bit data into the second symbol comprises converting the 2 bits of the plurality of bit data into the second symbol using the first to fourth basis functions,
   the first basis function and the fourth basis function have opposite phases, the second basis function and the third basis function have opposite phases, and the first basis function and the second basis function are orthogonal to each other.

12. The method of claim 7, further comprising adding a dummy bit after a payload of the second sub-carrier when a bit number of effective data among the plurality of bit data is odd.

13. The method of claim 7, wherein the first sub-carrier signal and the second sub-carrier signal comprise an end of signaling indicating whether a bit number of effective data among the plurality of bit data is odd or even, respectively.

14. An apparatus for transmitting a tag comprising:
   a data signal generator to generate a plurality of bit data;
   a bit-symbol converter to convert 2 bits of the plurality of bit data into a first symbol using phase information and orthogonal information;
   a first sub-carrier generator to generate a first sub-carrier signal by multiplying the first symbol by a square wave having a first link frequency; and
   a first load modulator to modulate the first sub-carrier signal,
   wherein the bit-symbol converter further converts 2 bits of the plurality of data into a second symbol, and
   wherein the apparatus further comprises:
      a demultiplexer to divide the first symbol and the second symbol in parallel;
      a second sub-carrier generator to generate a second sub-carrier signal by multiplying the second symbol by a square wave having a second link frequency; and
      a second load modulator to modulate the second sub-carrier signal.

15. The apparatus of claim 14, wherein the bit-symbol converter converts the 2 bits of the plurality of bit data into the first symbol using first to fourth basis functions,
   wherein the first basis function and the fourth basis function have opposite phases, the second basis function and the third basis function have opposite phases, and the first basis function and the second basis function are orthogonal to each other.

16. The apparatus of claimer 14, wherein the first link frequency is double the second link frequency.

17. The apparatus of claimer 14, wherein a preamble is transmitted through a sub-carrier signal having a higher frequency of the first sub-carrier signal and the second sub-carrier signal.

18. The apparatus of claim 14, wherein the data signal generator adds a dummy bit to effective data of the plurality of bit data when a bit number of the effective data is odd.

* * * * *